United States Patent
Morimoto

(10) Patent No.: US 11,519,852 B2
(45) Date of Patent: Dec. 6, 2022

(54) GAS DETECTION-USE IMAGE PROCESSING DEVICE, AND GAS DETECTION-USE IMAGE PROCESSING METHOD

(71) Applicant: Konica Minolta, Inc., Tokyo (JP)

(72) Inventor: Takashi Morimoto, Suita (JP)

(73) Assignee: Konica Minolta, Inc., Tokyo (JP)

( * ) Notice: Subject to any disclaimer, the term of this patent is extended or adjusted under 35 U.S.C. 154(b) by 264 days.

(21) Appl. No.: 16/765,728

(22) PCT Filed: Dec. 26, 2018

(86) PCT No.: PCT/JP2018/047772
§ 371 (c)(1),
(2) Date: May 20, 2020

(87) PCT Pub. No.: WO2019/138873
PCT Pub. Date: Jul. 18, 2019

(65) Prior Publication Data
US 2020/0292445 A1    Sep. 17, 2020

(30) Foreign Application Priority Data
Jan. 9, 2018 (JP) .............................. JP2018-001223

(51) Int. Cl.
*G01N 21/3504* (2014.01)
*G01M 3/02* (2006.01)
*G01N 21/17* (2006.01)

(52) U.S. Cl.
CPC .......... *G01N 21/3504* (2013.01); *G01M 3/02* (2013.01); *G01N 2021/1704* (2013.01)

(58) Field of Classification Search
CPC ....... G01N 21/3504; G01N 2021/1704; G01N 21/3518; G01M 3/02; G01M 3/38; G01J 5/48
See application file for complete search history.

(56) References Cited

U.S. PATENT DOCUMENTS

2016/0238451 A1    8/2016    Zeng

FOREIGN PATENT DOCUMENTS

| JP | 2-190733 A | 7/1990 | |
| JP | 2016-114500 A | 6/2016 | |
| JP | 2016114500 A * | 6/2016 | |
| WO | WO-2017009819 A1 * | 1/2017 | ............... G01C 3/32 |
| WO | 2017/104617 A1 | 6/2017 | |

OTHER PUBLICATIONS

International Search Report (ISR) dated Mar. 26, 2019 filed in PCT/JP2018/047772.
PCT Written Opinion of the International Searching Authority dated Mar. 26, 2019 filed in PCT/JP2018/047772.

* cited by examiner

*Primary Examiner* — David Z Huang
(74) *Attorney, Agent, or Firm* — Rankin, Hill & Clark LLP

(57) ABSTRACT

A gas detection-use image processing device is provided with a first input unit on which an operation of inputting a flow rate of gas used as an index of a gas concentration level which is wanted to be detected is performed to input the flow rate, a second input unit to which an image of an imaging target taken by the imaging device is input, and a first calculation unit which calculates, when the image is taken in a state in which the gas of the flow rate appears in an imaging range of the imaging device, a region in which the gas may be visualized in the imaging range.

9 Claims, 7 Drawing Sheets

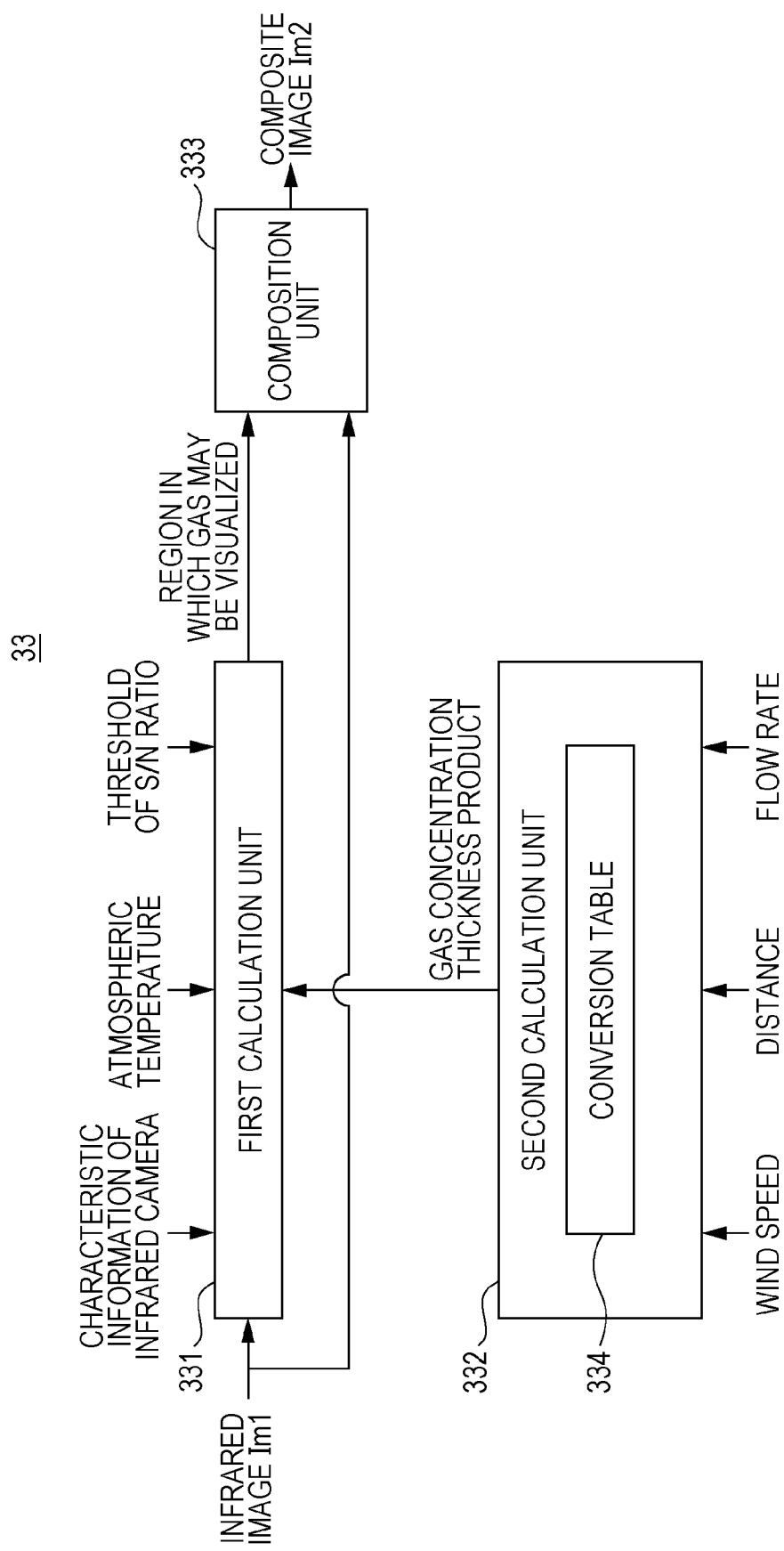

BOUNDARY

FIG. 5
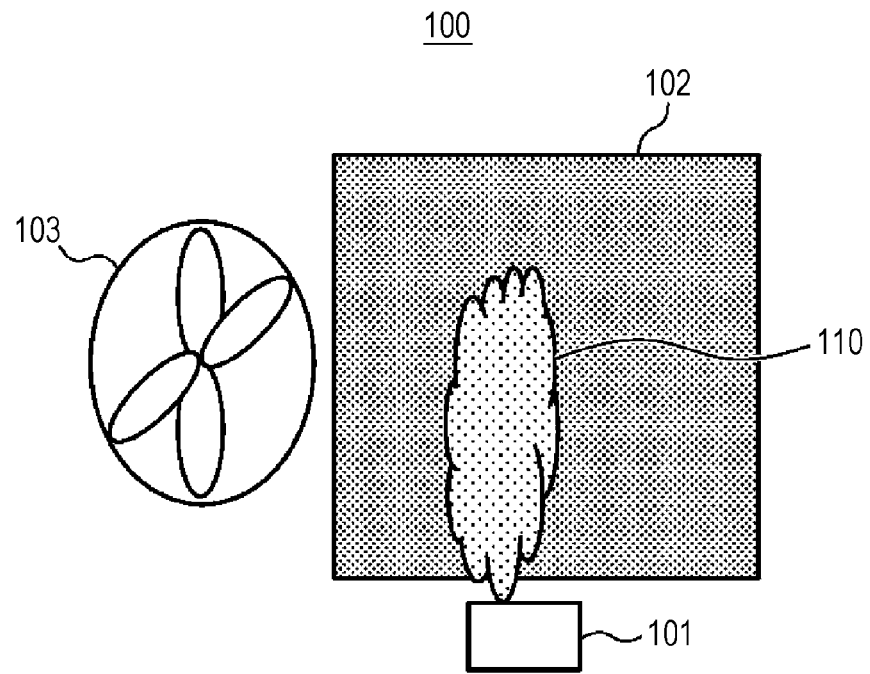
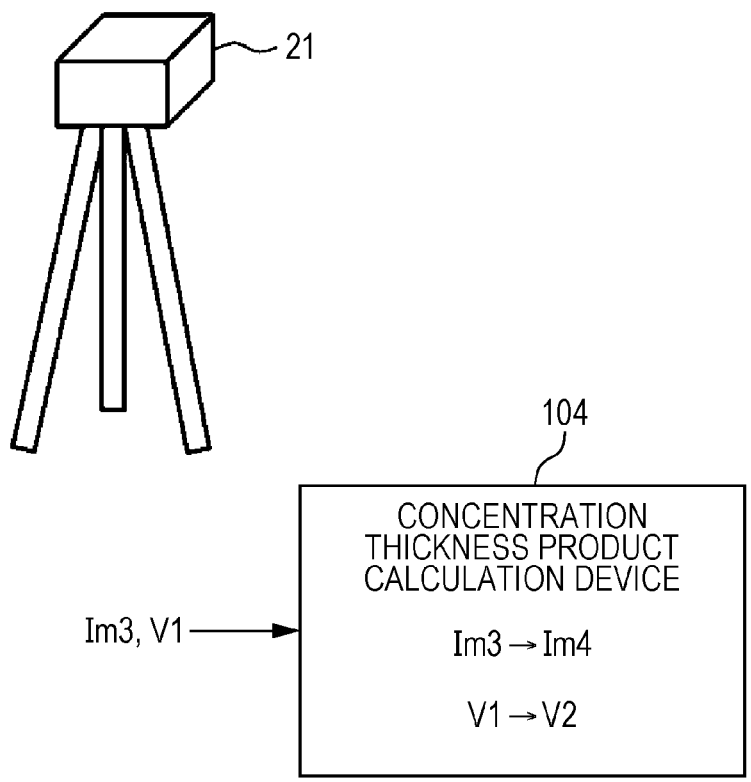

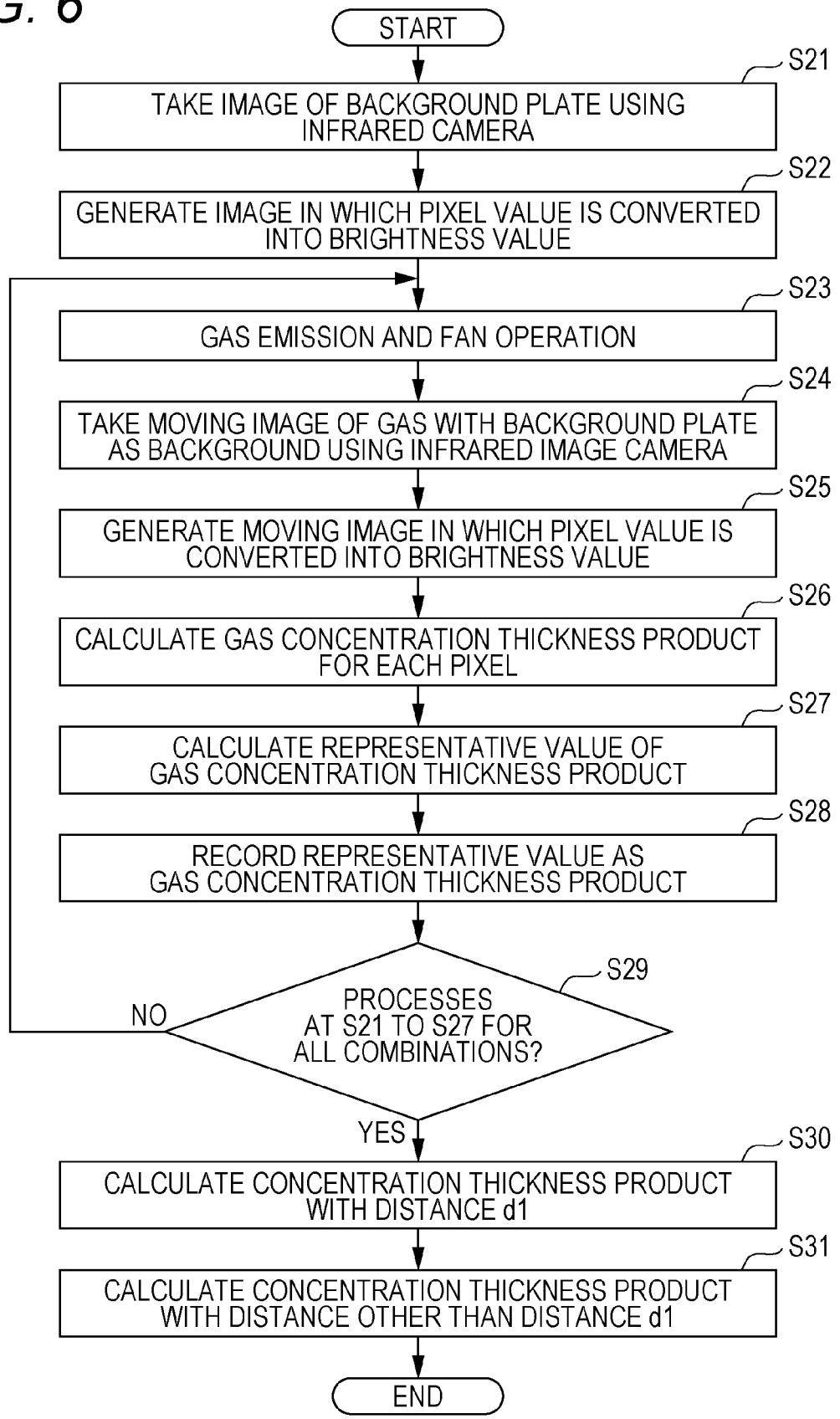

GAS DETECTION-USE IMAGE PROCESSING DEVICE, AND GAS DETECTION-USE IMAGE PROCESSING METHOD

TECHNICAL FIELD

The present invention relates to a technology of detecting gas using an image.

BACKGROUND ART

As facilities which handle a large amount of gas during operation, there are, for example, gas plants, petrochemical plants, thermal power plants, and iron-making related facilities. In these facilities, a gas detection device is used because gas leakage might occur due to time-dependent deterioration of the facilities, an erroneous operation of the facilities and the like. Accordingly, the gas leakage may be found in a state in which the gas leakage is small, so that a large accident may be prevented.

As the gas detection device, a probe type gas detection device is widely used, but recently, an infrared image type gas detection device is used. The former detects the gas based on a change in electrical characteristic of the probe when gas molecules come into contact with a detection probe. The latter detects the gas based on a property of the gas to absorb or radiate light.

The infrared image type gas detection device is described in detail. When gas is present, a part of electromagnetic waves (mainly, electromagnetic waves in an infrared region) generated by black-body radiation of a background object of absolute temperature of OK or higher is absorbed by the gas, and the gas itself radiates electromagnetic waves by black-body radiation, so that an electromagnetic wave amount changes. Therefore, when the gas is present in an imaging range of an infrared image, a pixel value (brightness value) of a pixel corresponding to a region in which the gas is present out of the infrared image is a value reflecting a change in electromagnetic wave amount. Therefore, it becomes possible to detect the gas and visualize the gas. According to the infrared image type gas detection device, gas detection may be performed without bringing an infrared camera close to an imaging target (for example, a gas transport pipe in a plant).

The infrared image type gas detection device detects the change in electromagnetic wave amount caused by the presence of the gas. An electromagnetic wave change amount depends on a concentration thickness product being a value obtained by integrating a gas concentration in a depth direction of a space in which the gas is floating, so that the concentration thickness product is used as an index of a gas concentration level in the infrared image type gas detection device.

In principle, detection ability of the infrared image type gas detection device is affected by weather, atmospheric temperature, and a wind speed. In a case where the weather is cloudy or rainy, where the atmospheric temperature is low, or where the wind speed is high, the detection ability is deteriorated, and there is a case where the gas cannot be visualized even when the gas is present in the imaging range. This is because a temperature difference between a background and the gas becomes small and the electromagnetic wave change amount in the region in which the gas is present becomes small in a case where the weather is cloudy or rainy, because the electromagnetic wave amount itself becomes small in a case where the atmospheric temperature is low, and because the gas is rapidly diffused to be diluted in case where the wind speed is high. There also is a case in which a region in which the gas cannot be visualized due to the background, a shade and the like is partially present in the imaging range. For example, in a case where a part of the imaging range is shaded, there is a case where the detection ability is deteriorated so that the gas cannot be visualized in the shaded region.

Therefore, a technology of determining whether a gas leakage examination realized by using the infrared image type gas detection device is effective or not is suggested (for example, refer to Patent Literature 1).

An entire imaging range may be the region in which the gas may be visualized, the entire imaging range may be a region in which the gas cannot be visualized, and the region in which the gas may be visualized and the region in which the gas cannot be visualized may be mixed in the imaging range (for example, a part of the imaging range is shaded). Therefore, the gas detection device (in other words, a person who performs gas detection) is required to grasp in advance a region in which the gas of the gas concentration level which is wanted to be detected may be visualized in the imaging range. In order to calculate the region in which the gas may be visualized, the concentration thickness product of the gas is required as a parameter of the gas concentration level which is wanted to be detected. Patent Literature 1 discloses that a value determined by the gas concentration and thickness is used for calculating the region in which the gas may be visualized (paragraph 0036 of Patent Literature 1).

The concentration thickness product of the gas is not a commonly known unit. In facilities such as plants, the infrared image type gas detection device comes into use recently for the gas detection, so that many workers are not familiar to the concentration thickness product of the gas. For this reason, it is difficult for the worker who performs the gas detection to determine an appropriate value of the concentration thickness product of the gas as the index of the gas concentration level which is wanted to be detected on a gas detection site.

CITATION LIST

Patent Literature

Patent Literature 1: U.S. Patent Application Publication No. 2016/0238451

SUMMARY OF INVENTION

An object of the present invention is to provide a gas detection-use image processing device and a gas detection-use image processing method capable of calculating a region in which gas may be visualized even if a person who performs gas detection does not have knowledge of a concentration thickness product of the gas.

In order to realize the above-described object, a gas detection-use image processing device reflecting an aspect of the present invention is provided with a first input unit, a second input unit, and a first calculation unit. To the first input unit, by an operation of inputting a flow rate of gas used as an index of a gas concentration level which is wanted to be detected, the flow rate is input. To the second input unit, an image of an imaging target taken by an imaging device is input. The first calculation unit calculates, when the image is taken in a state in which the gas of the flow rate appears in an imaging range of the imaging device, a region in which the gas may be visualized in the imaging range.

Advantages and features provided by one or more embodiments of the present invention may be sufficiently understood from the detailed description given below and the accompanying drawings. The detailed descriptions and accompanying drawings are provided by way of example only and are not intended as limiting definitions of the present invention.

BRIEF DESCRIPTION OF DRAWINGS

FIG. 2 is a block diagram illustrating a relationship among a first calculation unit, a second calculation unit, and a composition unit included in an image processing unit.

FIG. 5 is a schematic diagram illustrating an example of an experimental facility used for creating a conversion table.

FIG. 6 is a flowchart for illustrating a method of creating the conversion table.

DESCRIPTION OF EMBODIMENTS

Figure 1A:
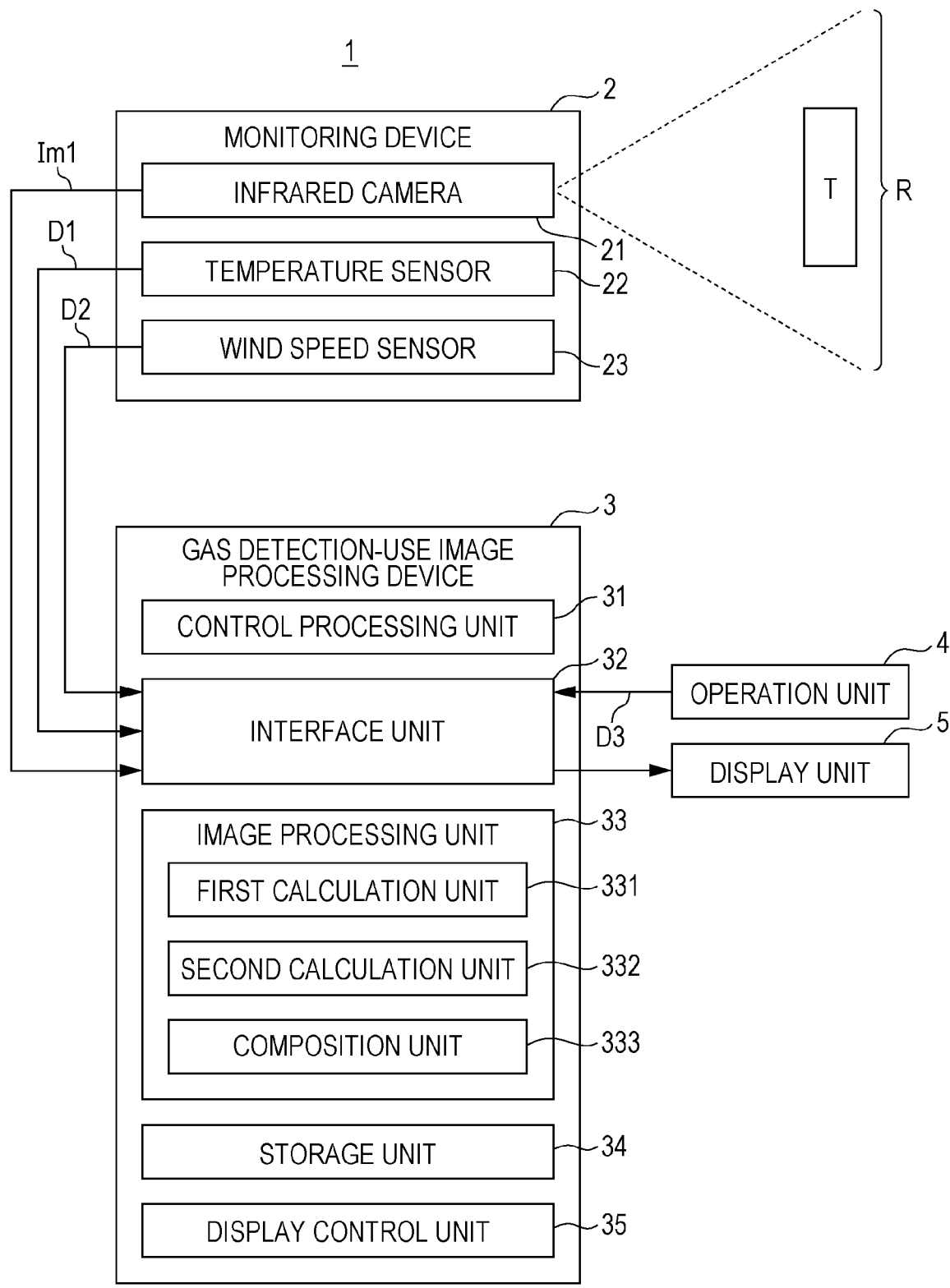
FIG. 1A is a block diagram of a gas detection system to which a gas detection-use image processing device according to an embodiment is applied.

Hereinafter, one or a plurality of embodiments of the present invention is described with reference to the drawings. However, the scope of the invention is not limited to the disclosed embodiments.

In each of the drawings, configurations assigned with the same reference numeral represent the same configuration, and the description of the configuration already described is not repeated.

FIG. 1A is a block diagram of a gas detection system 1 to which a gas detection-use image processing device 3 according to the embodiment is applied. The gas detection system 1 is provided with a monitoring device 2, the gas detection-use image processing device 3, an operation unit 4, and a display unit 5.

The monitoring device 2 is provided with an infrared camera 21, a temperature sensor 22, and a wind speed sensor 23.

The infrared camera 21 (an example of the imaging device) is connected to the gas detection-use image processing device 3, takes an infrared image Im1 of an imaging target T under the control of this device, and transmits the infrared image Im1 to the gas detection-use image processing device 3. In the embodiment, a monitoring target of gas leakage (for example, a gas transport pipe) is described as an example of the imaging target T. The infrared camera 21 may take a moving image and may take a still image. An angle of the infrared camera 21 is set so that the imaging target T is included in an imaging range R of the infrared camera 21.

The infrared camera 21 is provided with a two-dimensional image sensor having sensitivity to a light absorption wavelength of a gas which is wanted to be detected. For example, in a case of a hydrocarbon-based gas, a two-dimensional image sensor having sensitivity to a wavelength band of about 3 μm is used. As such a sensor, for example, there is a cooled indium antimony (InSb) image sensor.

In a case where the wavelength band of an electromagnetic wave absorbed or radiated by the gas which is wanted to be detected is other than a wavelength band of infrared light (for example, a wavelength band of ultraviolet light), a camera having sensitivity to this wavelength band is used.

The temperature sensor 22 measures atmospheric temperature in a place where the imaging target T is located when the infrared camera 21 images the imaging target T (in a case of the moving image, the atmospheric temperature during an imaging period is measured) and transmits atmospheric temperature data D1 indicating the measured atmospheric temperature to the gas detection-use image processing device 3. In the embodiment, a place where the monitoring device 2 is installed is regarded as the place where the imaging target T is located, and atmospheric temperature in the place where the monitoring device 2 is installed is measured by the temperature sensor 22. Note that, it is also possible that only a measurement probe of the temperature sensor 22 is installed near the place where the imaging target T is located and the temperature in the place where the imaging target T is located is monitored by transmitting measured temperature data to the monitoring device 2 by wire or wirelessly. The gas detection-use image processing device 3 may also obtain the atmospheric temperature in the place where the imaging target T is located from a website regarding weather. In this case, the temperature sensor 22 becomes unnecessary.

The wind speed sensor 23 measures a wind speed in the place where the imaging target T is located when the infrared camera 21 images the imaging target T (in a case of the moving image, the wind speed during the imaging period is measured), and transmits wind speed data D2 indicating the measured wind speed to the gas detection-use image processing device 3. In the embodiment, the place where the monitoring device 2 is installed is regarded as the place where the imaging target T is located, and the wind speed in the place where the monitoring device 2 is installed is measured by the wind speed sensor 23. Note that, it is also possible that only a measurement probe of the wind speed sensor 23 is installed near the place where the imaging target T is located and the wind speed in the place where the imaging target T is located may be measured by transmitting measured wind speed data to the monitoring device 2 by wire or wirelessly. The gas detection-use image processing device 3 may also obtain the wind speed in the place where the imaging target T is located from the website regarding the weather. In this case, the wind speed sensor 23 becomes unnecessary.

The gas detection-use image processing device 3 is provided on a personal computer, a smartphone, a tablet terminal and the like, and is provided with, as functional blocks, a control processing unit 31, an interface unit 32, an image processing unit 33, a storage unit 34, and a display control unit 35.

The control processing unit 31 is a device for controlling each unit (the interface unit 32, the image processing unit 33, the storage unit 34, and the display control unit 35) of the gas detection-use image processing device 3 according to a function of each unit.

The interface unit 32 is an interface connected to the control processing unit 31 for communicating between the gas detection-use image processing device 3 and devices outside the device (the infrared camera 21, the temperature sensor 22, the wind speed sensor 23, the operation unit 4, and the display unit 5) under the control of the control processing unit 31. The interface unit 32 and the external devices may be directly connected or may be connected via a LAN.

The image processing unit 33 is connected to the control processing unit 31 and performs various types of image processing required for gas detection using the infrared image Im1 under the control of the control processing unit 31. When a person who performs the gas detection (hereinafter, referred to as a "gas inspector") uses the operation unit 4 to input a command to execute the gas detection to the gas detection-use image processing device 3, the image processing unit 33 performs image processing of extracting a region in which the gas appears (hereinafter, sometimes simply referred to as a "gas region") on a frame forming the moving image taken by the infrared camera 21. When the gas appears in the imaging range R because the gas leaks from the imaging target T, the gas region is extracted.

When the gas inspector uses the operation unit 4 to input a command to calculate a region in which the gas may be visualized to the gas detection-use image processing device 3, the image processing unit 33 performs processing of calculating the region in which the gas may be visualized in the imaging range R. The image processing unit 33 is provided with a first calculation unit 331, a second calculation unit 332, and a composition unit 333 for performing the processing. These functional blocks are described later.

The storage unit 34 is connected to the control processing unit 31 and stores various images, data, and information required for calculating the region in which the gas may be visualized under the control of the control processing unit 31.

The storage unit 34 stores the infrared image Im1 transmitted from the infrared camera 21 in association with date and time when the infrared image Im1 is taken, stores the atmospheric temperature data D1 transmitted from the temperature sensor 22 in association with date and time when the atmospheric temperature is measured (in other words, the date and time when the infrared image Im1 is taken), and stores the wind speed data D2 transmitted from the wind speed sensor 23 in association with date and time when the wind speed is measured (in other words, the date and time when the infrared image Im1 is taken).

The storage unit 34 stores flow rate data D3 indicating a flow rate of the gas input by the gas inspector by operating the operation unit 4.

The storage unit 34 stores in advance distance data indicating a distance between the infrared camera 21 and the imaging target T, stores in advance characteristic information of the infrared camera 21 (for example, sensitivity and noise of the infrared camera 21), and stores in advance a threshold of an S/N ratio.

The display control unit 35 allows the display unit 5 to display various images. For example, the display control unit 35 allows the display unit 5 to display the moving image subjected to the processing of extracting the gas region by the image processing unit 33 or allows the display unit 5 to display a composite image Im2 obtained by combining the region in which the gas may be visualized with the infrared image Im1.

The operation unit 4 is a device connected to the interface unit 32 by which the gas inspector inputs various commands and various data to the gas detection-use image processing device 3. The command includes, for example, the command to execute the gas detection, a command to stop the gas detection, and the command to calculate the region in which the gas may be visualized. The data is, for example, the flow rate data D3 indicating the flow rate of the gas. This is used to calculate the region in which the gas may be visualized. This flow rate is, for example, a minimum value of the flow rate at which danger (gas explosion) due to the gas leakage occurs.

The display unit 5 displays the various images described above.

Figure 1B:
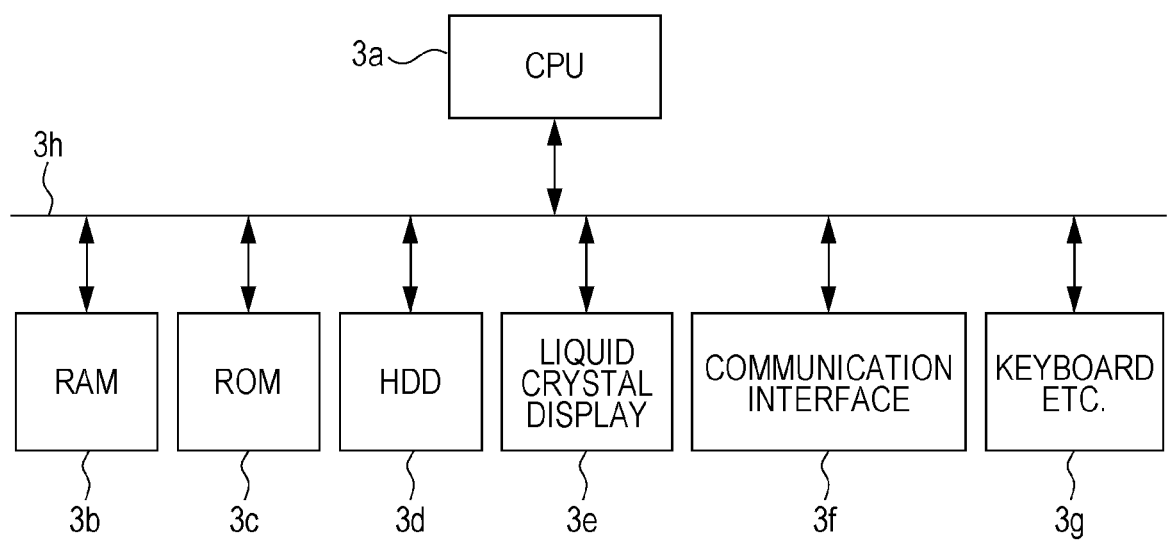
FIG. 1B is a block diagram illustrating a hardware configuration of the gas detection-use image processing device according to the embodiment.

FIG. 1B is a block diagram illustrating a hardware configuration of the gas detection-use image processing device 3 according to the embodiment. The gas detection-use image processing device 3 is provided with a central processing unit (CPU) 3a, a random access memory (RAM) 3b, a read only memory (ROM) 3c, a hard disk drive (HDD) 3d, a liquid crystal display 3e, a communication interface 3f, a keyboard and the like 3g, and a bus 3h for connecting them. The liquid crystal display 3e is hardware for realizing the display unit 5. In place of the liquid crystal display 3e, an organic light emitting diode display (Organic EL display), a plasma display and the like may be used. The communication interface 3f is hardware which realizes the interface unit 32, and is, for example, a communication card for wired communication or wireless communication. The keyboard and the like 3g is hardware for realizing the operation unit 4. A touch panel or a mouse may also be used in place of the keyboard.

The HDD 3d stores, for the control processing unit 31, the image processing unit 33, and the display control unit 35, programs for realizing the functional blocks and various data (for example, the infrared image Im1, the atmospheric temperature data D1, and the wind speed data D2). The program may be stored in the ROM 3c in place of the HDD 3d. The gas detection-use image processing device 3 may be provided with a flash memory in place of the HDD 3d, and the programs and data may be stored in the flash memory. The HDD 3d is hardware which realizes the storage unit 34. A flash memory may be used in place of the HDD 3d.

The CPU 3a is an example of a hardware processor, and by reading the above-described programs from the HDD 3d to develop on the RAM 3b and executing the developed programs, the control processing unit 31, the image processing unit 33, and the display control unit 35 are realized. However, regarding the functions, some or all of the functions may be realized by processing by a digital signal processor (DSP) in place of or together with processing by the CPU 3a. Similarly, some or all of the functions may be realized by processing by a dedicated hardware circuit in place of or together with processing by software.

FIG. 2 is a block diagram illustrating a relationship among the first calculation unit 331, the second calculation unit 332, and the composition unit 333 included in the image processing unit 33. The first calculation unit 331 calculates the region in which the gas may be visualized in the imaging range R based on the infrared image Im1.

The second calculation unit 332 calculates a concentration thickness product of the gas (hereinafter, sometimes simply referred to as a "concentration thickness product") using the flow rate of the gas input as an index of a gas concentration level which is wanted to be detected as a parameter. The concentration thickness product is calculated using the wind speed in the place where the imaging target T is located, the distance between the imaging target T and the infrared camera 21, and the flow rate of the gas leaking from the imaging target T as parameters.

The second calculation unit 332 stores in advance a conversion table 334 which converts a combination of the three parameters into the concentration thickness product. In a case where the concentration thickness product corresponding to the combination of the three parameters is not found in the conversion table 334, the second calculation unit 332 performs linear interpolation or spline interpolation to calculate the concentration thickness product of the gas. Note that, the second calculation unit 332 may calculate the concentration thickness product of the gas by three-dimensional interpolation using the three parameters.

Figure 3:
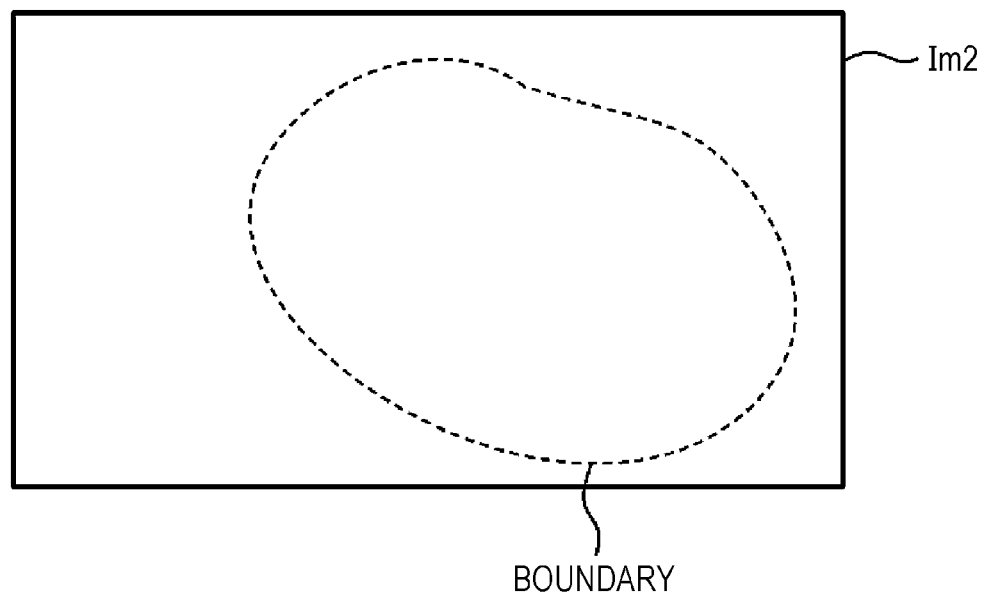
FIG. 3 is a schematic diagram illustrating an example of a composite image.

The composition unit 333 generates a boundary of the region in which the gas may be visualized calculated by the first calculation unit 331, and generates the composite image Im2 obtained by combining the boundary with the infrared image Im1 used for calculating the region. FIG. 3 is a schematic diagram illustrating an example of the composite image Im2. The inside of the boundary is the region in which the gas may be visualized, and the outside of the boundary is a region in which the gas cannot be visualized. For example, the composition unit 333 performs processing of making the inside of the boundary (region in which the gas may be visualized) blue and making the outside of the boundary (region in which the gas cannot be visualized) red.

Figure 4:
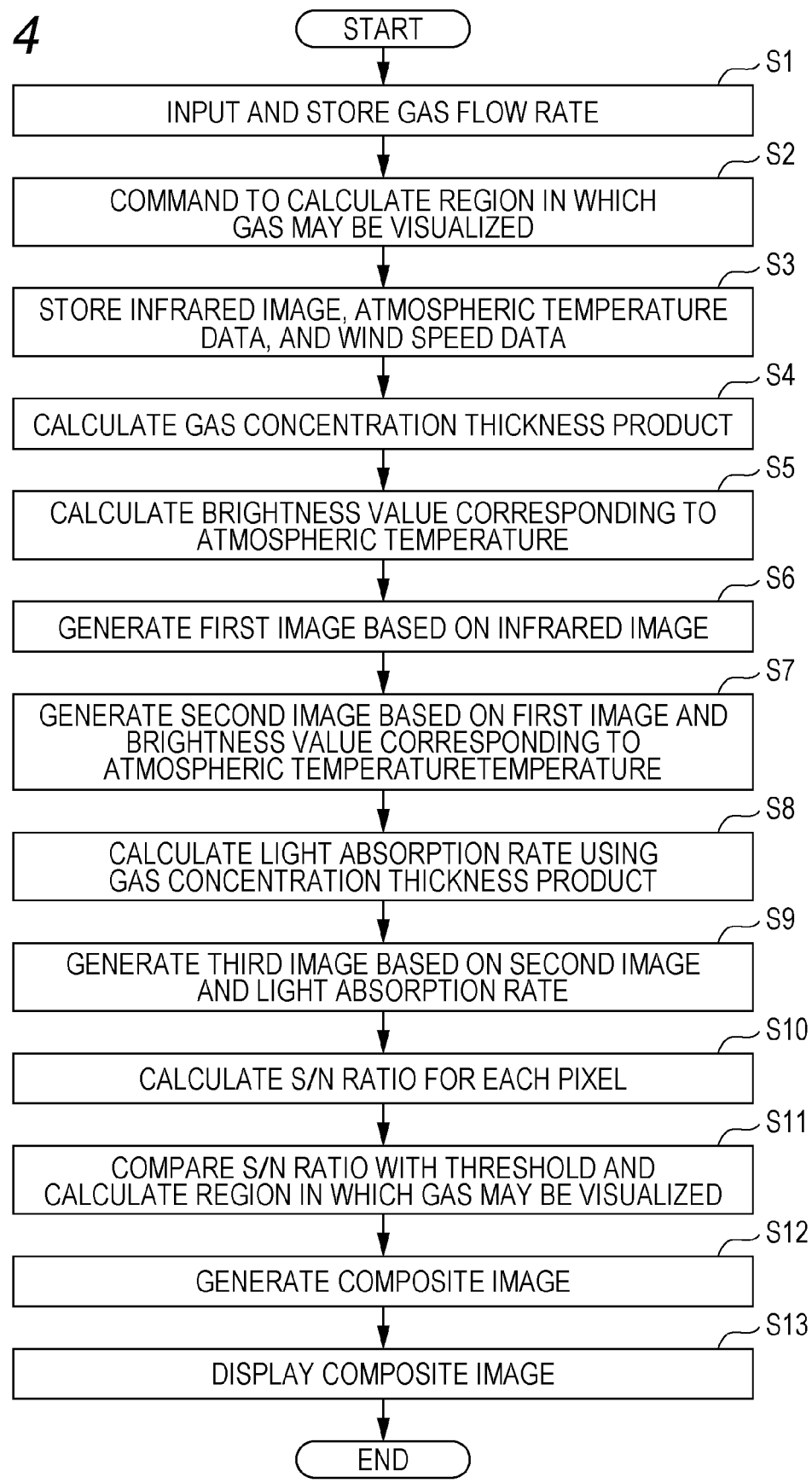
FIG. 4 is a flowchart for illustrating calculation of a region in which gas may be visualized using the embodiment.

Next, the calculation of the region in which the gas may be visualized using the embodiment is described. FIG. 4 is a flowchart for illustrating this. The calculation of the region in which the gas may be visualized is described using a still image of the infrared image Im1 as an example, but a moving image may also be used. In a case of the moving image, each frame is subjected to the processing similar to that of the still image.

With reference to FIG. 1A, FIG. 2, and FIG. 4, the gas inspector operates the operation unit 4 and specifies the flow rate of the gas to be detected before executing the gas detection. This flow rate is the minimum value of the flow rate at which the danger due to the gas leakage occurs. The flow rate data D3 indicating the specified flow rate is input to the interface unit 32 (first input unit), and the control processing unit 31 allows the storage unit 34 to store the input flow rate data D3 (step S1).

The gas inspector operates the operation unit 4 to issue the command to calculate the region in which the gas may be visualized (step S2). This command is input to the interface unit 32. Accordingly, the control processing unit 31 controls the infrared camera 21, the temperature sensor 22, and the wind speed sensor 23, allows the infrared camera 21 to take the infrared image Im1 of the imaging target T, allows the temperature sensor 22 to measure the atmospheric temperature in the place where the monitoring device 2 is installed (place where the imaging target T is located), and allows the wind speed sensor 23 to measure the wind speed in the place where the monitoring device 2 is installed (place where the imaging target T is located).

The infrared camera 21 transmits the taken infrared image Im1 to the gas detection-use image processing device 3, the temperature sensor 22 transmits the atmospheric temperature data D1 indicating the measured atmospheric temperature to the gas detection-use image processing device 3, and the wind speed sensor 23 transmits the wind speed data D2 indicating the measured wind speed to the gas detection-use image processing device 3. Accordingly, the infrared image Im1, the atmospheric temperature data D1, and the wind speed data D2 are input to the interface unit 32. In this manner, the image of the imaging target T taken by the infrared camera 21 is input to the interface unit 32 (second input unit). The control processing unit 31 allows the storage unit 34 to store the infrared image Im1, the atmospheric temperature data D1, and the wind speed data D2 input to the interface unit 32 (step S3).

The second calculation unit 332 calculates the concentration thickness product of the gas (step S4). More specifically, the second calculation unit 332 reads the flow rate data D3 (step S1) stored in the storage unit 34, reads the wind speed data D2 (step S3) stored in the storage unit 34, and reads the distance data (distance between the imaging target T and the infrared camera 21) stored in advance in the storage unit 34. Then, the second calculation unit 332 calculates the concentration thickness product assigned to the combination of the three parameters with reference to the conversion table 334.

The first calculation unit 331 reads the atmospheric temperature data D1 (step S3) stored in the storage unit 34 and calculates a brightness value corresponding to the atmospheric temperature indicated by the atmospheric temperature data D1 (step S5). Specifically, the first calculation unit 331 converts the atmospheric temperature indicated by the atmospheric temperature data D1 into the brightness value of the infrared image Im1 by using the characteristic information of the infrared camera 21 (for example, the sensitivity and noise of the infrared camera 21) stored in advance in the storage unit 34 as a parameter. This brightness value is a brightness value of an image of an object obtained when the infrared camera 21 images the object of the same temperature as the atmospheric temperature.

The first calculation unit 331 reads the infrared image Im1 (step S3) stored in the storage unit 34 and generates a first image obtained by converting a value of each pixel of the infrared image Im1 into the brightness value (step S6).

The first calculation unit 331 generates a second image indicating a difference between the value (brightness value) of each pixel of the first image and the brightness value corresponding to the atmospheric temperature (step S5) (step S7).

The first calculation unit 331 calculates a light absorption rate by the gas using the concentration thickness product of the gas calculated by the second calculation unit 332 (step S4) (step S8).

For each pixel of the second image, the first calculation unit 331 generates a third image obtained by multiplying the value of the pixel by the light absorption rate (step S9).

The first calculation unit 331 calculates the S/N ratio being a ratio between a value S of the pixel and noise N of the infrared camera 21 for each pixel of the third image (step S10). The noise N of the infrared camera 21 is stored in the storage unit 34 in advance.

The first calculation unit 331 determines whether an absolute value of the S/N ratio is larger than a predetermined threshold (hereinafter, the threshold of the S/N ratio) for each pixel of the third image. The threshold of the S/N ratio is stored in the storage unit 34 in advance. The absolute value of the S/N ratio is used because there is a case where the value S of each pixel of the third pixel is a positive value and a case where this is a negative value depending on a relationship between a background temperature and the atmospheric temperature. The first calculation unit 331 determines that a region indicated by the pixel having the absolute value of the S/N ratio larger than the threshold of the S/N ratio is the region in which the gas may be visualized (step S11), and determines that the region other than this is the region in which the gas cannot be visualized. In this manner, the first calculation unit 331 calculates the region in which the gas may be visualized in the imaging range R when the infrared image Im1 is taken in a state in which the gas of the flow rate (the flow rate of the gas input by operation of the operation unit 4 by the inspector) appears in the imaging range R of the infrared camera 21.

The composition unit 333 generates the boundary of the region in which the gas may be visualized calculated by the first calculation unit 331, reads the infrared image Im1 (step S3) from the storage unit 34, combines the boundary with the infrared image Im1 in a site in which the region is located to generate the composite image Im2 in which the colors are different between the inside and outside the boundary (step S12). The composite image Im2 serves as information indicating the position of the region in which the gas may be visualized.

The display control unit 35 allows the display unit 5 (output unit) to display the composite image Im2 (step S13). Accordingly, the gas inspector may grasp the region in which the gas may be visualized in the imaging range R of the infrared camera 21.

Since the flow rate of the gas is a commonly known unit, this is familiar to the gas inspector. According to the embodiment, the parameter input by the gas inspector is not the concentration thickness product of the gas but the flow rate of the gas. Therefore, according to the embodiment, the gas inspector may calculate the region in which the gas may be visualized even without knowledge of the concentration thickness product of the gas.

In the embodiment, the region in which the gas may be visualized is calculated before the gas detection system 1 executes the gas detection; however, the region in which the gas may be visualized may be calculated after the gas detection is executed. This is performed for the gas inspector to later verify effectiveness of the gas detection. The storage unit 34 stores the infrared image Im1 taken in the past, and the atmospheric temperature data D1 and the wind speed data D2 when the infrared image Im1 is taken. The gas inspector operates the operation unit 4 to specify the infrared image Im1 in which the region in which the gas may be visualized is wanted to be calculated, specifies the flow rate of the gas described at step S1, and issues the command described at step S2. Thereafter, processes similar to those at steps S3 to S13 are performed.

An example of a creating method of the conversion table 334 is described. FIG. 5 is a schematic diagram illustrating an example of an experimental facility 100 used for creating the conversion table 334. The experimental facility 100 is provided with a gas discharge device 101, the infrared camera 21, a background plate 102, a fan 103, and a concentration thickness product calculation device 104.

A gas cylinder (not illustrated) filled with a gas 110 which is wanted to be detected is connected to the gas discharge device 101, and an experimenter may adjust a flow rate adjusting valve of the gas discharge device 101 to adjust the flow rate of the gas 110 emitted by the gas discharge device 101.

The infrared camera 21 is arranged in front of the gas discharge device 101 and images the gas 110 emitted by the gas discharge device 101.

The background plate 102 is arranged behind the gas discharge device 101 and serves as a background of the gas 110 emitted by the gas discharge device 101. A surface of the background plate 102 is subjected to surface treatment (for example, matte coating) in order to improve efficiency of black-body radiation. The background plate 102 includes a built-in heater, and the heater may adjust temperature of an entire background plate 102 to a constant value.

The fan 103 sends air to the gas 110 emitted from the gas discharge device 101. A rotation speed of the fan 103 may be adjusted. The wind speed is determined based on the rotation speed of the fan 103.

The concentration thickness product calculation device 104 is a computer device in which a program for calculating the concentration thickness product of the gas is stored.

A calculating theory of the concentration thickness product of the gas is as follows. The concentration thickness product is calculated based on the light absorption rate of the gas expressed by Equation 1.

[Math. 1]

$$\alpha_{gas} = I_1 - I_0 / I_A - I_0 \qquad \text{Equation 1}$$

$\alpha_{gas}$ (gas is subscript) is the light absorption rate of the gas. I0 (0 is subscript) is the brightness value of the infrared image Im1 of the background plate 102 taken in a state in which the gas is not emitted from the gas discharge device 101. I1 (1 is subscript) is the brightness value of the infrared image Im1 of the background plate 102 taken in a state in which the gas is emitted from the gas discharge device 101. When the infrared images Im1 are taken, the temperature of the entire background plate 102 is controlled to a constant value determined in advance. IA (A is subscript) is a value obtained by converting the temperature of the gas into the brightness value of the infrared image Im1 using the characteristic information (sensitivity, noise and the like) of the infrared camera 21 as the parameters. Note that, if the temperature of the gas emitted from the gas discharge device 101 may be approximated to the atmospheric temperature (the temperature of the gas 110 in the gas discharge device 101 is equal to or substantially equal to the atmospheric temperature), the atmospheric temperature may be converted into the brightness value of the infrared image Im1 in place of the temperature of the gas. In this case, it is not required to measure the temperature of the gas.

The light absorption rate of the gas is a function of the concentration thickness product of the gas. This function may be generally expressed by Equation 2.

[Math. 2]

$$1 - \alpha_{gas} = \int_{\lambda_1}^{\lambda_2} \exp(-\alpha(\lambda)ct) d\lambda = f(ct) \qquad \text{Equation 2}$$

$\alpha(\lambda)$ represents a light absorption coefficient of the gas. ct represents the concentration thickness product of the gas. $\lambda 1$ and $\lambda 2$ represent wavelength ranges to be integrated. The wavelength ranges are sensitivity wavelength ranges of the infrared camera 21.

An inverse function of a function f(ct) represents the concentration thickness product of the gas. From the description above, the concentration thickness product of the gas is calculated from the brightness values I0, I1, and IA in Equation 1. Note that, in a case where it is difficult to obtain the inverse function of the function f(ct) (for example, the function f(ct) is not expressed by one polynomial), a table indicating a relationship between the concentration thickness product and the light absorption rate of the gas may be used. When the light absorption rate of the gas is calculated using Equation 1, the concentration thickness product is calculated based on this table. When the concentration thickness product corresponding to the light absorption rate of the gas calculated using Equation 1 is not included in the table, the concentration thickness product is calculated using interpolation.

The calculating theory of the concentration thickness product of the gas is described as above. A method of creating the conversion table 334 based on this theory is described in detail. FIG. 6 is a flowchart illustrating the method of creating the conversion table 334.

With reference to FIGS. 5 and 6, a distance between the infrared camera 21 and the gas discharge device 101 is d1. The temperature of the entire background plate 102 is controlled to a constant value determined in advance. The experimenter takes an infrared image Im3 of the background plate 102 using the infrared camera 21 (step S21). At the time of imaging, the gas 110 is not emitted from the gas discharge device 101, and the fan 103 stops.

The experimenter saves the infrared image Im3 in the concentration thickness product calculation device 104. The concentration thickness product calculation device 104 converts the pixel value of each pixel of the infrared image Im3 into the brightness value. Accordingly, an image Im4 obtained by converting the pixel value into the brightness values is generated (step S22).

The experimenter allows the gas discharge device 101 to emit the gas 110 and activates the fan 103 to send wind to the gas 110 (step S23). The flow rate of the gas 110 is set to f1, and the speed (wind speed) of the wind sent from the fan 103 to the gas 110 is set to w1. The temperature of the entire background plate 102 is controlled to the above-described constant value. With the parameters of the distance d1, the flow rate f1, and the wind speed w1, the experimenter takes a moving image V1 of the gas 110 emitted by the gas discharge device 101 using the infrared camera 21 (step S24).

The experimenter saves the moving image V1 in the concentration thickness product calculation device 104. The concentration thickness product calculation device 104 converts the pixel value of each pixel of each frame (infrared image) forming the moving image V1 into the brightness value. Accordingly, a moving image V2 obtained by converting the pixel value into the brightness values is generated (step S25).

The concentration thickness product calculation device 104 calculates the concentration thickness product for each pixel of each frame forming the moving image V2 by using the image Im4 generated at step S22 and the moving image V2 generated at step S25 (step S26). A calculating method of the concentration thickness product is as described above.

The concentration thickness product calculation device 104 calculates a representative value of the concentration thickness product (step S27). There are a first method and a second method as calculating methods of the representative value. The first method extracts the gas region for each frame forming the moving image V2, calculates an average value of the concentration thickness products indicated by the respective pixels forming the gas region for each gas region, and makes an average value of these average values the representative value. The second method specifies, for each frame forming the moving image V2, the pixel having a maximum value of the concentration thickness product, and makes an average value of the concentration thickness products indicated by the pixels the representative value. The first method has higher accuracy of the representative value than the second method. The second method does not require the extraction of the gas region, so that this may calculate the representative value easier than the first method.

The concentration thickness product calculation device 104 records the representative value calculated at step S27 as the concentration thickness product corresponding to a combination of the wind speed w1 and the flow rate f1 (step S28).

A plurality of combinations of the wind speed and the flow rate is prepared in advance. The experimenter determines whether the processes at steps S21 to S28 are performed for all the combinations (step S29).

When the experimenter determines that the processes at steps S21 to S28 are not performed for all the combinations (No at step S29), the experimenter executes step S23 while changing the combination of the wind speed and the flow rate. Then, steps S24 to S28 are performed.

When the experimenter determines that the processes at steps S21 to S28 are performed for all the combinations (Yes at step S29), the calculation of the concentration thickness product ends for various combinations of the wind speed and the flow rate with the distance d1 (step S30).

The distance between the infrared camera 21 and the gas discharge device 101 and a size of a gas image appearing in each frame of the moving image V1 have a correlation. That is, when the distance d1 grows N-fold, the gas image becomes 1/N vertically and horizontally as compared with the gas image at the distance d1. Even if the distance between the infrared camera 21 and the gas discharge device 101 changes, the brightness of the gas image may be regarded as the same. Therefore, it is not necessary for the experimenter to take the image Im3 and the moving image V1 by using the infrared camera 21 in a case of a distance between the infrared camera 21 and the gas discharge device 101 other than the distance d1. The concentration thickness product calculation device 104 may calculate the concentration thickness product for the distance other than the distance d1 by performing an image scaling process using the moving image V2 and the image Im4 obtained at the distance d1 (step S31). From above, the concentration thickness product is obtained for various combinations of the wind speed, the distance, and the flow rate, so that the conversion table 334 may be completed.

Summary of Embodiment

A gas detection-use image processing device according to a first aspect of the embodiment is provided with a first input unit on which an operation of inputting a flow rate of gas used as an index of a gas concentration level which is wanted to be detected is performed to input the flow rate, a second input unit to which an image of an imaging target taken by the imaging device is input, and a first calculation unit which calculates, when the image is taken in a state in which the gas of the flow rate appears in an imaging range of the imaging device, a region in which the gas may be visualized in the imaging range.

Since the flow rate of the gas is the commonly known unit, this is familiar to a person who performs gas detection. The present inventor focused on this and made a parameter input by the person who performs the gas detection not a concentration thickness product of the gas but the flow rate of the gas (for example, a minimum value of the flow rate at which danger (gas explosion) due to gas leakage occurs)). Therefore, according to the gas detection-use image processing device according to the first aspect of the embodiment, it is possible to calculate the region in which the gas may be visualized even when the person who performs the gas detection does not have knowledge of the concentration thickness product of the gas.

The gas detection-use image processing device may be used, for example, for detecting the gas leakage.

The above-described configuration is further provided with a second calculation unit which calculates a concentration thickness product of the gas by using the flow rate, in which the first calculation unit calculates the region by using the concentration thickness product.

For example, the second calculation unit calculates the concentration thickness product by using a wind speed in a place where the imaging target is located when the imaging device takes the image, a distance from the imaging target to the imaging device, and the flow rate.

The above-described configuration is further provided with an output unit which outputs information indicating a position of the region in the imaging range.

The output unit generates, for example, a boundary of the region in which the gas may be visualized, generates a composite image obtained by combining the boundary with an image of an imaging target (for example, a gas transport pipe) taken by the imaging device in a site in which the region is positioned, and outputs the composite image as information indicating the position of the region in which the gas may be visualized. This information may be displayed on a display or printed on paper.

According to this configuration, since the information indicating the region in which the gas may be visualized in the imaging range is output, the person who performs the gas detection may easily recognize in which position in the imaging range the gas may be visualized.

A gas detection-use image processing method according to a second aspect of the embodiment is provided with a first input step of performing an operation of inputting a flow rate of gas used as an index of a gas concentration level which is wanted to be detected to input the flow rate, a second input step of inputting an image of an imaging target taken by the imaging device, and a first calculating step of calculating, when the image is taken in a state in which the gas of the flow rate appears in an imaging range of the imaging device, a region in which the gas may be visualized in the imaging range.

The gas detection-use image processing method according to the second aspect of the embodiment has action and effect similar to those of the gas detection-use image processing device according to the first aspect of the embodiment.

Although the embodiment of the present invention is illustrated and described in detail, this is merely simple illustration and example and not limitation. The scope of the present invention should be construed by the language of appended claims.

The entire disclosure of Japanese Patent Application No. 2018-001223 filed on Jan. 9, 2018 is incorporated herein by reference in its entirety.

INDUSTRIAL APPLICABILITY

According to the present invention, it is possible to provide the gas detection-use image processing device and the gas detection-use image processing method.

The invention claimed is:

1. A gas detection-use image processing device comprising:
   a first inputter on which an operation of inputting a flow rate of gas used as an index of a gas concentration level which is wanted to be detected is performed to input the flow rate;
   a second inputter to which an image of an imaging target taken by an imaging device is input; and
   a hardware processor which calculates, when the image is taken in a state in which the gas at the flow rate of a value entered in the first inputter appears in an imaging range of the imaging device, a region in which gas detection ability of the gas detection-use image processing device is higher than a threshold in the imaging range.

2. The gas detection-use image processing device according to claim 1, wherein
   the hardware processor calculates a concentration thickness product of the gas by using the flow rate, and
   calculates the region by using the concentration thickness product.

3. The gas detection-use image processing device according to claim 2,
   wherein the hardware processor calculates the concentration thickness product by using a wind speed in a place where the imaging target is located when the imaging device takes the image, a distance from the imaging target to the imaging device, and the flow rate.

4. The gas detection-use image processing device according to claim 3, further comprising:
   an outputter which outputs information indicating a position of the region in the imaging range.

5. The gas detection-use image processing device according to claim 2, further comprising:
   an outputter which outputs information indicating a position of the region in the imaging range.

6. The gas detection-use image processing device according to claim 1, further comprising:
   an outputter which outputs information indicating a position of the region in the imaging range.

7. The gas detection-use image processing device according to claim 1, wherein the hardware processor is configured to:
   calculate, for each pixel in the image, an absolute value of an S/N ratio, the S/N ratio being a ratio between a signal value of the pixel and noise of the imaging device; and
   determine, for each pixel in the image, whether the absolute value of the S/N ratio is larger than the threshold to calculate the region in the imaging range.

8. A gas detection-use image processing method comprising:
   performing an operation of inputting a flow rate of gas used as an index of a gas concentration level which is wanted to be detected to input the flow rate;
   inputting an image of an imaging target taken by an imaging device; and
   calculating, when the image is taken in a state in which the gas at the flow rate of a value entered in the first inputter appears in an imaging range of the imaging device, a region in which gas detection ability of the gas detection-use image processing device is higher than a threshold in the imaging range.

9. The gas detection-use image processing method according to claim 8, wherein the calculating the region in the imaging range including:
   calculating, for each pixel in the image, an absolute value of an S/N ratio, the S/N ratio being a ratio between a signal value of the pixel and noise of the imaging device; and
   determining, for each pixel in the image, whether the absolute value of the S/N ratio is larger than the threshold.

* * * * *